US011205101B1

(12) United States Patent
Kawas Garcia et al.

(10) Patent No.: US 11,205,101 B1
(45) Date of Patent: Dec. 21, 2021

(54) FORMULA AND RECIPE GENERATION WITH FEEDBACK LOOP

(71) Applicant: NotCo Delaware, LLC, Santiago (CL)

(72) Inventors: Nebil Kawas Garcia, Santiago (CL); Francisca Balbontin Puig, Santiago (CL); Karina Hyland, Brooklyn, CA (US); Cristobal Abarca, Santiago (CL); Francisco Clavero, Santiago (CL); Eugenio Herrera, Santiago (CL); Daniel Leal, Santiago (CL); Ariel Martinez, Santiago (CL); Pablo Olea, Santiago (CL); Nicolas Quiroz, Santiago (CL); Joaquin Ricci, Santiago (CL)

(73) Assignee: NotCo Delaware, LLC, Santiago (CL)

( * ) Notice: Subject to any disclaimer, the term of this patent is extended or adjusted under 35 U.S.C. 154(b) by 0 days.

(21) Appl. No.: 17/317,780

(22) Filed: May 11, 2021

(51) Int. Cl.
*G06K 9/62* (2006.01)
*G06N 3/08* (2006.01)

(52) U.S. Cl.
CPC ......... *G06K 9/6263* (2013.01); *G06K 9/6256* (2013.01); *G06N 3/08* (2013.01)

(58) Field of Classification Search
CPC ....... G06K 9/6263; G06K 9/6256; G06N 3/08
See application file for complete search history.

(56) References Cited

U.S. PATENT DOCUMENTS

| | | |
|---|---|---|
| 9,519,620 B1 | 12/2016 | Pinel |
| 10,325,181 B2 * | 6/2019 | Xu ........................ G06N 3/084 |
| 2013/0149679 A1 | 6/2013 | Tokuda |
| 2016/0358043 A1 * | 12/2016 | Mu ....................... G06K 9/6217 |
| 2017/0116517 A1 | 4/2017 | Chee |
| 2017/0139902 A1 | 5/2017 | Byron |
| 2018/0293489 A1 * | 10/2018 | Eyster ................ G06Q 30/0631 |
| 2019/0171707 A1 | 6/2019 | Rapaport |
| 2019/0228855 A1 * | 7/2019 | Leiter .................... G06N 3/084 |
| 2019/0228856 A1 | 7/2019 | Leifer |

(Continued)

OTHER PUBLICATIONS

The International Searching Authority, "Search Report" in application No. PCT/US2020/043330, dated Sep. 18, 2020, 16 pages.

(Continued)

*Primary Examiner* — John W Lee
(74) *Attorney, Agent, or Firm* — Haverstock & Owens LLP

(57) ABSTRACT

Techniques to mimic a target food item using artificial intelligence are disclosed. A formula generator is trained using ingredients and using recipes and, given a target food item, determines a formula that matches the given target food item. A flavor generator is trained using recipes and their associated flavor information and, given a formula, the flavor generator determines a flavor profile for the given formula. The flavor profile may be used to assist the formula generator in generating a subsequent formula. A recipe generator is trained using recipes and, given a formula, determines a cooking process for the given formula. A food item may be cooked according to a recipe, and feedback, including a flavor profile, may be provided for the cooked food item. The recipe and its feedback may be added to a training set for the flavor generator.

20 Claims, 18 Drawing Sheets

(56) References Cited

U.S. PATENT DOCUMENTS

2021/0219583 A1   7/2021   Pichara

OTHER PUBLICATIONS

Rudinger et al., Skip-Prop: Representing Sentences with One Vector Pre Proposition, 12th International Conference on Computational Semantics, dated 2017, 7 pages.
Karamanolakis et al., "Item Recommendation with Variational Autoencoders and Heterogeneous Priors", DLRS, dated Oct. 2018, 5 pages.
Current Claims in application No. PCT/US2020/043330, dated Sep. 2020, 5 pages.
Bowman et al., "Generating Sentences from a Continuous Space", dated May 12, 2016, 12 pages.
Patel, U.S. Appl. No. 16/924,006, filed Jul. 8, 2020, Office Action, dated Sep. 9, 2020.
Patel, U.S. Appl. No. 16/924,006, filed Jul. 8, 2020, Notice of Allowance, dated Dec. 2, 2020.
Korsunksky, U.S. Appl. No. 17/167,981, filed Feb. 4, 2021, Office Action, dated Apr. 15, 2021.
International Searching Authority, "Search Report," in application No. PCT/US2021/017111, dated Apr. 23, 2021, 29 pages.
David Xu, "Machine Learning for Flavor Development," Bachelor's Thesis, Harvard College, School of Engineering and Applied Sciences, Apr. 5, 2019, 69 pages.
Current Claims in application No. PCT/US2021/017111, dated Apr. 23, 2021, 6 pages.

* cited by examiner

| Search a target | | Selected targets |
| --- | --- | --- |
| fish | × | Fish, anchovy, european, raw |
| Custaceans, crayfish, mixed species, farmed, raw | | |
| Custaceans, crayfish, mixed species, wild, cooked, moist heat | | |
| Custaceans, crayfish, mixed species, wild, raw | | |
| DENNY'S, fish fillet, battered or breaded, fired | | |
| Fast foods, fish sandwich, with tartar sauce | | |
| Fast foods, fish sandwich, with tartar sauce and cheese | | |
| Fish anchovy, european, canned in oil, drained solids | | |
| Fish, anchovy, european, raw | | |
| Fish, bass, freshwater, mixed species, cooked, dry heat | | |
| Fish, bass, freshwater, mixed species, raw | | |
| Fish, bass, striped, cooked, dry heat | | |
| Fish, bass, striped, raw | | |
| Fish, blackfish, whole, (Alaska Native) | | |
| Fish, bluefish, cooked, dry heat | | |

Selected targets

Fish, anchovy, european, raw

[Edit selection]

Formula controls

Giuseppe, generate formulae with the following constraints: Avoid soy. Exclude 1 ingredient. When making the formulae consider water Thank you! [Go!]

[Ingredient restrictions] [Flavor profile] [Nutritional features]

Exclude ingredients

[Nuts, cash... salt added X]

Clear selection

Find the ingredients you want to exclude

Require ingredients

Find the ingredients you want to require

Exclude groups

✿ Gluten
⊘ Nuts
⊗ Soy
⬡ Honey

Selected targets

Fish, anchovy, european, raw

[Edit selection]

Formula controls

Giuseppe generate formulae with the following constraints: Avoid soy. Exclude 1 ingredient. Make sure every formula scores 4 on saltiness and 2 on umaminess. When making the formulae, consider water. Thank you!

[Go!]

[Ingredient restrictions] [Flavor profile] [Nutritional features]

Sweetness   Saltiness   Sourness   Bitterness   Umaminess 4                                              2

[Edit]   [Reset]   [Edit]   [Edit]   [Reset]

FIG. 2D

Selected targets

Fish, anchovy, european, raw

[Edit selection]

Formula controls

Giuseppe generate formulae with the following constraints: Avoid soy. Exclude 1 ingredient. Make sure every formula scores 4 on saltiness and 2 on umaminess. Change the default value of protein and fats. When making the formulae, don't consider water. Thank you!   [Go!]

| Ingredient restrictions | Flavor profile | Nutritional features |

Water
Consider Water

Nutrients

Fiber Carbs  ↻ [0] g/100g
Protein      ↻ [30] g/100g
Sugar Carbs  ↻ [0] g/100g
Fats         ↻ [2] g/100g

Giuseppe's creations

Targets chefs have requested Giuseppe to cook. Sorted alphabetically and separated between usernames

| VIEW
Cooked Targets

| SEARCH
Search Target

| INDEX
A.B.C.D.E.F.G.H.I.J.K.L.M
N.O.P.Q.R.S.T.U.V.W.X.Y.Z

| TAGS
◆yogurt ◆chicken ◆brazil
◆cheese ◆notmayo
◆noticecream ◆random
◆chile

Giuseppe's creations > Cooked Targets

A
Avocados, raw, all commercial varieties   By paula at 2020.10.17   ◆notmayo

B
Baby food, meat, chicken, junior   By donoso at 2020.11.05   ◆chicken
Bologna, beef and pork   By paula at 2020.10.21   ◆brazil ◆random
Beverages, Malted drink mix, chocolate, with added nutrients,
powder, prepared with whole milk
By marcos zamon at 2020.10.28   ◆random C
Cheese, cheddar, sharp sliced   By donoso at 2020.11.02   ◆cheese
Cheese, blue   By bermando at 2020.11.23   ◆cheese
Cheese, boilers or fryers, giblets, cooked, simmered
By bermando at 2020.11.23
Cheese, feet, boiled   By zanon at 2020.11.26   ◆cheese
Cheese, ground, raw   By catalina at 2020.11.10   ◆cheese
Cheese, mozzarella, low moisture, part-skim   By donso at 2020.10.22   ◆cheese
Cheese, mozzarella, part-skim   By donso at 2020.10.22   ◆cheese

Process Generator

Hello! Here you can ask giuseppe to create steps. You will need:

1. A title best describes what you are trying to achieve. Think in how you would search for recipe in Google.

2. The ingredients that you want to use. You can type a Formula ID to it automatically or add them manually 3. Click on Generate step and see the magic! Edit the text as you go to manipulate the generation Recipe title

[Vegan choco brownie]

Ingredients

[Fill with formula ID] →

[140] g [Wheat flour]          X
[20]  g [Cocoa Powder]         X
[5.7] g [Vanilla Extract]      X
[3]   g [Salt]                 X
[3]   g [Baking Powder]        X
[300] g [Sugar]                X
[240] g [Coconut oil RBD]      X
[ ]   g [ ]                    X

[Start over]

[Copy]
[Undo]
[Clear]

[Generate step]

Novelty : low

Process Generator

Hello! Here you can ask giuseppe to create steps. You will need:

1. A title best describes what you are trying to achieve. Think in how you would search for recipe in Google.

2. The ingredients that you want to use. You can type a Formula ID to it automatically or add them manually 3. Click on Generate step and see the magic! Edit the text as you go to manipulate the generation Recipe title

[Vegan choco brownie]

Ingredients

[Fill with formula ID] →

[140] g [Wheat flour]          X
[20]  g [Cocoa Powder]         X
[5.7] g [Vanilla Extract]      X
[3]   g [Salt]                 X
[3]   g [Baking Powder]        X
[300] g [Sugar]                X
[240] g [Coconut oil RBD]      X
[ ]   g [ ]                    X

[Start over]

---

☐ Copy
↶ Undo
✕ Clear

1) Put 140.00 g of wheat flour, 20.00 g of cocoa powder, 5.70 of vanilla extract, 3.00 g of baking powder and 3.00g of sugar in bowl 2) Mix the outcome of step 1 with your hands until a dough comes together in a compact mass 3) Stretch the outcome of step 2 in silicone sheet.

4) cut the outcome of step 3 into small squares.

5) Bake the outcome of step 4 at 170 degrees celsius for 15 minutes

6) Cool the outcome of step 5

Generated process finished

[Generate step]

Novelty : low

Fig. 4C

Formula 56c2-6ad6 > Documentation form

Formula #56c2-6ad6
From Target Fish, tuna, fresh, skipjack, raw
Formula generated by giuseppe at 2020.12.10 requested @tester

[1| Metadata] [2| Recipe] [3| Review]                                    [Create Recipe]
                                                                          [Save template]

Ingredients ∨
  Ingredients ($)
  | Ingredients Name | Mass (grams) | OK |
  |---|---|---|
  | o$1| nori seaweed | 8 grams | ✎✗ |
  | o$2| tomato concentrated pasta | 22 grams | ✎✗ |
  | o$3| nutritional yeast flakes | 6 grams | ✎✗ |
  | o$4| water | 150 grams | ✎✗ |
  | o$5| sea salt | 3 grams | ✎✗ |

Preparation ∨
  Step (=)
  [Find your action] [Pick an action first]                               [?] [OK]
  =1| add [8 grams of nori seaweed] [22 grams of tomato concentrated pasta] [150 grams of water] ✎✗
         [6 grams of nutritional yeast flakes] [3 grams of sea salt] in [thermomix]
  =2| chop [the result of step 1] for 2 minutes at speed 3 in 80 celsius   ✎✗
  =3| add increase speed [the result of step 2] to speed 6 for 2 minutes   ✎✗
  =4| let rest [the result of step 2] for 10 minutes                       ✎✗

←Back | Next→

FORMULA AND RECIPE GENERATION WITH FEEDBACK LOOP

BENEFIT CLAIM

This application is related to co-pending U.S. patent application Ser. No. 17/167,981, filed Feb. 4, 2021, titled "Controllable Formula Generation," and to co-pending U.S. patent application Ser. No. 17/221,129, filed Apr. 2, 2021, titled "Method of Classifying Flavors," the entire contents of each of which is hereby incorporated by reference as if fully set forth herein.

TECHNICAL FIELD

One technical field of the present disclosure is artificial intelligence and machine learning, as applied to food. Another technical field is food science. The disclosure relates, in particular, to use of machine learning to generate food formulas and recipes for foods that mimic target food items.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, many negative consequences of use of animals in the food industry are known, such as deforestation, pollution, human health conditions, and allergies, among others. In contrast, a plant-based diet is associated with improved health and well-being and reduces risk of diseases. Not only is a plant-based diet good for our health but it is also good for the Earth's health. Research has shown that production of plant-based food items generates less greenhouse emissions and require less energy, water, and land than production of animal-based food items. There are plant alternatives to animal-based food items. For example, plant alternatives to meat include veggie burgers and other vegan meat food items. However, these alternatives do not match the taste and texture of meat.

Accordingly, there is a need for improved techniques to mimic a target food item, such as an animal-based target food item, by matching nutritional and sensory attributes as much as possible. Unfortunately, many techniques for development of new foods rely upon time-consuming, inaccurate, manual laboratory work in which different ingredients are combined in different ways and tested. These approaches are inefficient, involve extensive time to develop a single successful food formula, and waste physical resources.

SUMMARY

The appended claims may serve as a summary of the invention.

BRIEF DESCRIPTION OF THE FIGURES

The present invention is illustrated by way of example, and not by way of limitation, in the figures of the accompanying drawings and in which like reference numerals refer to similar elements and in which:

FIGS. 2B-2E illustrate example graphical user interface displays of a formula generator in accordance with some embodiments.

FIGS. 3B-3E illustrate example graphical user interface displays of a creation finder in accordance with some embodiments.

FIGS. 4B, 4C illustrate example graphical user interface displays of a recipe generator in accordance with some embodiments.

DETAILED DESCRIPTION

Figure 1:
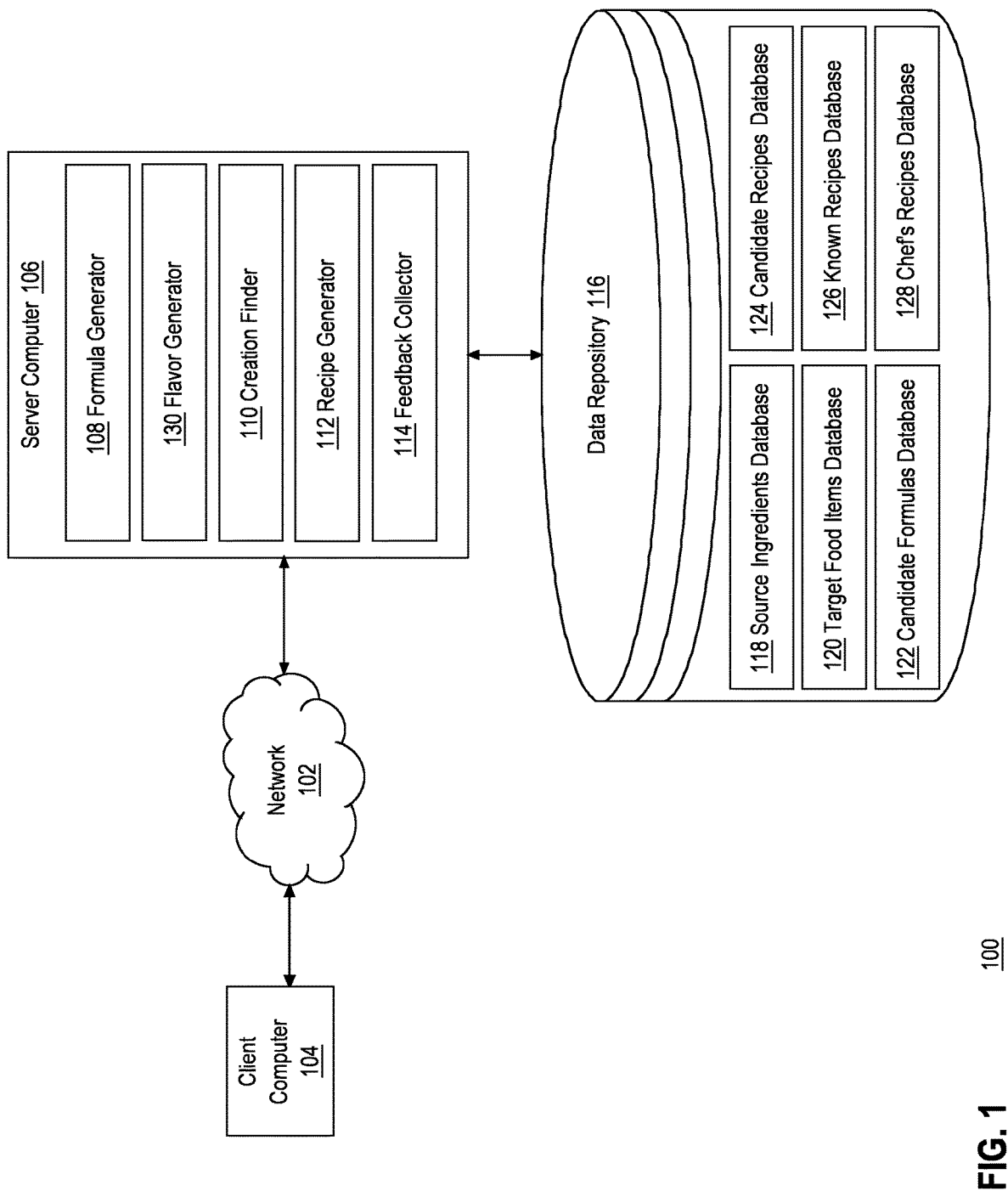
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:
1.0 GENERAL OVERVIEW
2.0 STRUCTURAL OVERVIEW
3.0 FUNCTIONAL OVERVIEW
3.1 FORMULA GENERATOR
3.2 FLAVOR CLASSIFIER
3.3 CREATION FINDER
3.4 RECIPE GENERATOR
3.5 FEEDBACK COLLECTOR
4.0 EXAMPLE EVENT FLOW
5.0 GRAPHICAL USER INTERFACE IMPLEMENTATIONS
6.0 PROCEDURAL OVERVIEW
7.0 HARDWARE OVERVIEW
8.0 SOFTWARE OVERVIEW
9.0 OTHER ASPECTS OF DISCLOSURE

1.0 General Overview

Computer-implemented techniques to mimic a target food item using artificial intelligence are disclosed. The techniques include training a formula generator, a flavor generator, and a recipe generator. The formula generator is trained using ingredients and recipes. Given a target food item, the trained formula generator determines a formula that matches the given target food item. The flavor generator is trained using recipes and their associated flavor information. Given a formula, the trained flavor generator determines a flavor profile for the given formula. The flavor profile may be used to assist the formula generator in generating a subsequent formula. The recipe generator is trained using recipes. Given a formula, the trained recipe generator determines a cooking process for the given formula. A food item may be cooked according to a recipe. After the food item is cooked according to the recipe, feedback, including a flavor profile, may be provided for the cooked food item. The recipe and its feedback may be added to a training set for the flavor generator. The training set for the flavor generator is continuously being built up by using feedback data from recipes that have been cooked. Using a robust training set increases the accuracy of the flavor generator. As outputs of the flavor generator may be used as guidance by the formula generator, better formulas are generated by the formula generator that mimic target food items, which in turn leads to better recipes being generated by the recipe generator.

In an embodiment, a computer-implemented method comprises the steps of: creating a first training set for training an artificial intelligence formula model to generate predicted formulas, wherein the first training set includes first sets of ingredients of a plurality of first recipes, wherein each set of the first sets of ingredients is associated with a recipe from the plurality of first recipes; creating a second training set for training an artificial intelligence flavor model to generate predicted flavors, wherein the second training set includes second sets of ingredients of a plurality of second recipes and flavor profiles, each set of the second sets of ingredients and a respective flavor profile are associated with a recipe from the plurality of second recipes; creating a third training set for training an artificial intelligence recipe model to generate predicted recipes, wherein the third training set includes the plurality of first recipes; generating, using the trained artificial intelligence formula model and the trained artificial intelligence flavor model, a predicted formula that mimics a target food item; generating, using the trained artificial intelligence recipe model, a predicted recipe for the predicted formula; receiving feedback data for a cooked food item associated with the predicted recipe, wherein the feedback data includes a flavor profile of the cooked food item; updating the second training set using the predicted recipe and the feedback data.

Other embodiments, aspects, and features will become apparent from the reminder of the disclosure as a whole.

2.0 Structural Overview

FIG. 1 illustrates an example networked computer system 100 with which various embodiments may be practiced. FIG. 1 is shown in simplified, schematic format for purposes of illustrating a clear example and other embodiments may include more, fewer, or different elements. FIG. 1, and the other drawing figures and all of the description and claims in this disclosure, are intended to present, disclose, and claim a technical system and technical methods comprising specially programmed computers, using a special-purpose distributed computer system design and instructions that are programmed to execute the functions that are described. These elements execute functions that have not been available before to provide a practical application of computing technology to the problem of generating formulas and recipes for foods (e.g., plant-based foods) that mimic other foods (e.g., animal-based foods). In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example FIG. 1, the networked computer system 100 comprises a client computer(s) 104, a server computer 106, a data repository(ies) 116, which are communicatively coupled directly or indirectly via one or more networks 102. In an embodiment, the server computer 106 broadly represents one or more computers, such as one or more desktop computers, server computers, a server farm, a cloud computing platform (like Amazon EC2, Google Cloud, container orchestration (Kubernetes, Docker, etc.)), or a parallel computer, virtual computing instances in public or private datacenters, and/or instances of a server-based application.

The server computer 106 includes one or more computer programs or sequences of program instructions that is organized to implement formula generating functions, flavor generating functions, creation finding functions, recipe generating functions, and feedback collecting functions. Programs or sequences of instructions organized to implement the formula generating functions may be referred to herein as a formula generator 108. Programs or sequences of instructions organized to implement the flavor generating functions may be referred to herein as a flavor generator 130. Programs or sequences of instructions organized to implement the creation finding functions may be referred to herein as a creation finder 110. Programs or sequences of instructions organized to implement the recipe generating functions may be referred to herein as a recipe generator 112. Programs or sequences of instructions organized to implement the feedback collecting functions may be referred to herein as a feedback collector 114.

In an embodiment, the formula generator 108 is programmed to generate one or more formulas each comprising a set of ingredients and their quantities, amounts, or proportions (referred herein to as quantities) to match a target food item in a feature space. One or more artificial intelligence models of the formula generator 108 may be trained to match from a feature space of ingredients to the target food item, to generate one or more formulas for the target food item. Formulas (ingredients and corresponding quantities) generated by the formula generator 108 are referred to as candidate formulas. As an example, a target food item may be animal-based, and candidate formulas may be plant-based.

In an embodiment, the flavor generator 130 is programmed to generate a predicted flavor profile for a formula. The formula may be a candidate formula previously generated by the formula generator 108, a synthetic formula (e.g., user created formula, which may be based on a candidate formula), or a formula in a known recipe (e.g., recipe scraped from a website or another source). One or more artificial intelligence models of the flavor generator 130 may be trained to receive the formula and to determine the predicted flavor profile for the formula. The predicted flavor profile includes flavor descriptors or features (e.g., sweetness, saltiness, sourness, bitterness, and/or umaminess; collectively referred to as flavor features) and corresponding flavor intensity levels.

In an embodiment, the creation finder 110 is programmed to search for a candidate formula from a plurality of candidate formulas, using one or more search parameters such as keywords and filters.

In an embodiment, the recipe generator 112 is programmed to generate a recipe comprising a cooking process for a formula. The formula may be a candidate formula or a synthetic formula. One or more artificial intelligence models may be trained to receive the formula and to generate a cooking process for the formula. The cooking process may include a set of actions, cooking utensils, or steps to cook the set of ingredients of the formula. Recipes (ingredients, corresponding quantities, and cooking process) generated by the recipe generator 112 are referred to as candidate recipes.

In an embodiment, the feedback collector 114 is programmed to associate user-provided feedback data with a recipe. The recipe may be a candidate recipe previously generated by the recipe generator 112, a synthetic recipe (e.g., user created recipe, which may be based on a candidate recipe), or a known recipe. The feedback data describes properties of a cooked food item produced from the recipe. The properties may include a user-provided flavor profile and other sensorial descriptors of a cooked food item produced from the recipe.

In some embodiments, in keeping with sound software engineering principles of modularity and separation of function, the formula generator 108, the flavor generator 130, the creation finder 110, the recipe generator 112, and the feedback collector 114 are implemented as a logically separate program, process or library.

The server computer 106 also includes receiving instructions (not illustrated) and displaying instructions (not illustrated). The receiving instructions are programmed to receive data from a client computer 104 and/or a data repository 116 for further processing. For example, the receiving instructions may be programmed for receiving user input, such as user input specifying a target food item, search criteria, feedback data, etc. The displaying instructions are programmed to cause one or more computing devices, such as a client computer 104 to display content, such as content from and/or generated by the formula generator 108, the flavor generator 130, the creation finder 110, the recipe generator 112, and/or the feedback collector 114. Other sets of instructions may be included to form a complete system such as an operating system, utility libraries, a presentation layer, database interface layer and so forth.

Computer executable instructions described herein may be in machine executable code in the instruction set of a CPU and may have been compiled based upon source code written in Python, JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the figure may represent the manner in which programmers or software developers organize and arrange source code for later compilation into an executable, or interpretation into bytecode or the equivalent, for execution by the server computer 106.

The server computer 106 may be coupled to the data repository 116 that includes a source ingredients database 118, a target food items database 120, a candidate formulas database 122, a candidate recipes database 124, a known recipes database 126, and a chef's recipes database 128. As used herein, the term "database" refers to a corpus of data, organized or unorganized, in any format, with or without a particular interface for accessing the corpus of data. Each database 118, 120, 122, 124, 126, 128 may be implemented using memory, e.g., RAM, EEPROM, flash memory, hard disk drives, optical disc drives, solid state memory, or any type of memory suitable for database storage.

In an embodiment, the source ingredients database 118 includes raw ingredients from various sources, such as from USDA's National Agricultural Library. An ingredient may be plant-based, animal-based, water-based, synthetic, or a combination thereof. Each ingredient in the source ingredients database 118 may be associated with an ingredient vector. The ingredient vector includes a list of values relating to physiochemical, nutritional, and/or molecular descriptors or features (referred to herein as nutritional features). The nutritional features of the ingredient are obtained by screening the ingredient using spectroscopy techniques, chromatography techniques, and/or suitable techniques, and/or by referencing open source databases such as those associated with the U.S. Department of Agriculture's (USDA) National Agricultural Library. The ingredient vector may also include a word embedding, such as a BERT embedding, and/or a list of values relating to flavor features. The ingredients in the source ingredients database 118 are used as a training set to train one or more artificial intelligence models of the formula generator 108.

In an embodiment, the target food items database 120 includes target food items. Each target food item in the target food items database 120 may be associated with a target vector and properties of the target food item. The target vector includes a list of values relating to nutritional features. The nutritional features of the target food item are obtained by screening the target food item using spectroscopy techniques, chromatography techniques, and/or suitable techniques, and/or by referencing open source databases such as those associated with the U.S. Department of Agriculture's (USDA) National Agricultural Library. The properties of the target food item may include a flavor profile, color, smell, textures, aftertaste, and the like. The flavor profile of the target food item may be represented as a flavor vector. A target food item from the target food items database 120 may be an input to the one or more artificial intelligence models of the formula generator 108 to generate a candidate formula that includes one or more ingredients from the source ingredients database 118, that mimic the target food item with regards to nutritional features and/or other features.

In an embodiment, the candidate formulas database 122 includes candidate formulas generated by the formula generator 108. Each candidate formula includes one or more ingredients from the source ingredients database 118 and corresponding quantities and mimics a target food item from the target food items database 120, and is associated with a predicted flavor profile generated by the flavor generator 130. Each candidate formula may be in a specific format to use as input to the one or more artificial intelligence models of the recipe generator 112 to generate a candidate recipe.

In an embodiment, the candidate recipes database 124 includes candidate recipes generated by the recipe generator 112. Each candidate recipe includes ingredients, corresponding quantities, and a cooking process for cooking the ingredients, and may be associated with a predicted flavor profile generated by the flavor generator 130.

In an embodiment, the known recipes database 126 includes recipes obtained from online websites or other sources. Each recipe in the known recipes database 126 includes ingredients, corresponding quantities, and a cooking process for cooking the ingredients. The recipes in the known recipes database 126 are in a specific format and are used as a training set to train one or more artificial intelligence models of the recipe generator 112, and may be associated with a predicted flavor profile generated by the flavor generator 130. Ingredients in each recipe may be represented as a set of ingredient vectors.

In an embodiment, the chef's recipes database 128 includes recipes that may be from the candidate recipes database 124 and/or from known recipes database 126 and have been cooked and reviewed by chefs (e.g., company persons and/or machines). Each recipe in the chef's recipes database 128 may include ingredients, corresponding quantities, a cooking process for cooking the ingredients, and feedback provided by the chefs. The recipes in the chef's recipes database 128 are in a specific format and are used as a training set to train the one or more artificial intelligence models of the formula generator 108. Each recipe may be represented as a recipe vector. The recipe vector includes a first component corresponding to nutritional features and a second component representing the ingredients in the recipe. User-provided feedback describes properties of a cooked food item. The properties may include a user-provided flavor profile, color, smell, textures, aftertaste, and the like. In an embodiment, flavor profiles, whether generated by the flavor generator 130 or provided by a user, may each be represented as a flavor vector.

The network 102 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 102 and the disclosure presumes that all elements of FIG. 1 are communicatively coupled via the network 102. The various elements depicted in FIG. 1 may also communicate with each other via direct communications links that are not depicted in FIG. 1 for purposes of explanation.

The server computer 106 is accessible over the network 102 by a client computer 104 to request a formula (set of ingredients and quantities) based on a target food item, to find a previously generated formula based on search parameters, to request a recipe (cooking process for a given formula), and to provide sensorial feedback for a given recipe. The client device 104 may comprise a desktop computer, laptop computer, tablet computer, smartphone, or any other type of computing device that allows access to the server computer 106. The elements in FIG. 1 are intended to represent one workable embodiment but are not intended to constrain or limit the number of elements that could be used in other embodiments.

3.0 Functional Overview

In an embodiment, the formula generator 108, the flavor generator 130, the creation finder 110, the recipe generator 112, the feedback collector 114, and the data repository 116 interoperate programmatically in an unconventional manner to generate one or more formulas based on a target food item, each formula identifying one or more ingredients and their respective quantities, to identify a previously generated formula based on search parameters, to generate a recipe based on a given formula, and to associated feedback for a given recipe.

3.1 Formula Generator

Figure 2A:
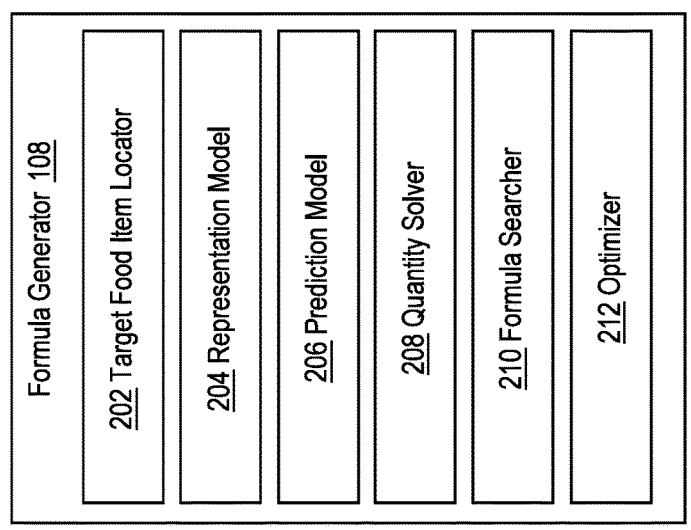
FIG. 2A illustrates an example formula generator in accordance with some embodiments.

FIG. 2A illustrates an example formula generator in accordance with some embodiments. In the example of FIG. 2A, the formula generator 108 comprises a target food item locator 202, a representation model 204, a prediction model 206, a quantity solver 208, a formula searcher 210, and an optional optimization layer or optimizer 212. Example recipe generator, representation model, prediction model, quantity solver, formula searcher, and optimization layer or optimizer are described in co-pending U.S. patent application Ser. No. 17/167,981, filed Feb. 4, 2021, titled "Controllable Formula Generation," wherein the entire contents of which are hereby incorporated by reference as if fully set forth herein.

The target food item locator 202 may be programmed to locate or find a target food item from the target food items database 120 based on search criteria, such as keywords and/or filters. A keyword may include a name or identifier of a target food item or one or more ingredients that make up the target food item. An example target food item is animal-based food item that a chef wants to mimic using only plant-based ingredients.

The representation model 204 may be programmed to generate a latent or encoded representation of each of a plurality of ingredients in the source ingredients database 118 of FIG. 1. The representation model 204 may use an autoencoder architecture to compress the knowledge (e.g., ingredients) into a latent space Z. The latent or encoded representation is a condensed knowledge of ingredients or ingredient vocabulary embeddings.

The prediction model 206 may be programmed to learn an encoded search space R (e.g., a latent space with a probability distribution) and to decode any latent vector r from the encoded search space R into a candidate set of ingredients. The prediction model 206 may use a variational autoencoder architecture to compress sets of ingredients extracted from recipes, such as from the known recipes database 126, into the encoded search space R. The prediction model 206 uses transfer learning (e.g., ingredient vocabulary embeddings) from the representation model 204 to encode and decode the sets of ingredients. In an embodiment, to obtain decoded ingredients in a vegan space, animal-based ingredients may be masked in the ingredient vocabulary embeddings. For example, encoded vectors for chicken and tuna are masked (e.g., set to zero). The masking ensures that only plant-based ingredients are selected. During inference, the prediction model 206 may generate as many candidate sets of ingredients as needed or desired by sampling different points in the encoded search space R. Each ingredient in each candidate set of ingredients is an ingredient from the source ingredients database 118.

The quantity solver 208 may be programmed to receive a target food item and a candidate set of ingredients generated by the prediction model 206 and to determine a quantity for each of the ingredients in the candidate set, based on the target food item, resulting in a candidate formula (ingredients and corresponding quantities). The quantity solver 208 may formulate a constrained vertex optimization problem as a quantity solver objective function to determine the quantities of the ingredients and to determine a score for the candidate formula. The score relates to how close the candidate formula is to the target food item. In an embodiment, the problem may be solved in a particular feature space, such as the USDA feature space.

The optimizer 212 may be programmed to learn, from existing recipes, how ingredients are usually combined. The optimizer 212 is programmed to receive a target food item and a candidate set of ingredients generated by the prediction model 206 and to determine, based on the learned combinations, new representations of the target food item and the candidate set of ingredients, which may be used by the quantity solver 208 to determine a quantity for each of the ingredients in the candidate set of ingredients and a corresponding score.

The formula searcher 210 may be programmed to, given the encoded search space R of sets of ingredients and a target food item, find an optimal formula from a plurality of candidate formulas to reconstruct or mimic the target food item. The formula searcher 210 may perform one or more different searches, such as a local search and a global search. The local search may encode a target recipe into the probability distribution, and sample and decode that distribution. The global search may use an optimization technique to search within the encoded search space R of sets of ingredients and evaluates each candidate formula using the quantity solver objective function. Example optimization techniques are a Bayesian optimization technique, a black box optimization technique, and a gradient descent optimization technique. Controls may be defined or input (e.g., by a user of the formula generator 108) to control the sampling of the encoded search space R. Example controls include constraints relating to ingredient restrictions, flavor profile, and nutritional features.

The formula generator 108 may be trained using a plurality of training sets. A training set includes ingredients from the source ingredient database 118 and may be used to train the representation model 204 of the formula generator 108. The representation model 204 is trained to generate the ingredient vocabulary embeddings, which are used by the prediction model 206. Another training set includes sets of ingredients in recipes from, for example, the known recipes database 126 and may be used to train the prediction model 206 of the formula generator 108. The prediction model 206 is trained to transform its input data into the latent space R.

One or more candidate formulas generated by the formula generator 108 to mimic a target food item are stored in the candidate formulas database 122. The candidate formulas generated by the formula generator 108 that mimic the target food item with regards to nutritional features, may vary in ingredients and their quantities, and/or the number of ingredients and may be stored in the candidate formulas database 122 under a creation family name. The creation family name may simply be the same name or identifier used for the target food item. Each candidate formula may be also associated with a candidate name or identifier. Accordingly, a candidate formula may be searched by an associated creation family name and/or candidate name.

3.2 Flavor Generator

Example flavor generator is described in co-pending U.S. patent application Ser. No. 17/167,981, filed Feb. 4, 2021, titled "Controllable Formula Generation," and co-pending U.S. patent application Ser. No. 16/983,406, filed Aug. 3, 2020, titled "Method of Classifying Flavors," now U.S. Pat. No. 10,993,465, wherein the entire contents of which are hereby incorporated by reference as if fully set forth herein. The flavor generator 130 may include a certainty level classifier that generates, for each flavor category of a plurality of flavor categories, a certainty level to indicate a level of certainty that a flavor associated with that flavor category is present. The flavor generator 130 may also include a plurality of flavor predictors associated with the plurality of flavor categories. Each flavor predictor generates a deeper level of flavor granularity corresponding to an associated flavor category.

The flavor generator 130 may be programmed to receive a formula, such as a candidate formula generated by the formula generator 108, and to determine a predicted flavor profile for that formula. The flavor generator 130 may use a classifier architecture to learn from recipes with known flavor profiles, such as from the chef's recipe database 128, to classify flavors. The predicted flavor profile generated for the candidate formula may be compared to the flavor profile of the target food item to determine how close the candidate formula is to the target food item with regards to flavor and to, thus, may be used to guide the formula searcher 210 to look for latent points in the encoded search space R where the flavor occurs.

The flavor generator 130 may be trained using a training set that includes sets of ingredients in recipes and corresponding flavor profiles that are from, for example, the chef's recipes database 128 and/or known recipes 126. The flavor generator 130 is trained to match the sets of ingredients to the corresponding flavor profiles.

Each candidate formula in the candidate formulas database 122 may be stored with a predicted flavor profile generated by the flavor generator 130.

3.3 Creation Finder

Figure 3A:
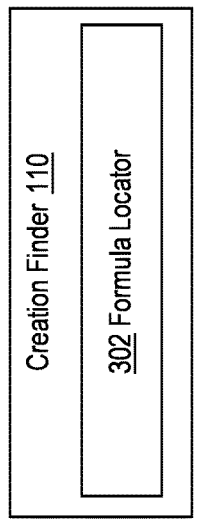
FIG. 3A illustrates an example creation finder in accordance with some embodiments.

FIG. 3A illustrates an example creation finder in accordance with some embodiments. In the example of FIG. 3A, the creation finder 110 comprises a formula locator 302.

The formula locator 302 may be programmed to locate or find one or more candidate formulas from the candidate formulas database 122 based on search criteria, such as keywords and/or filters. A keyword may include a creation family name. A search based on a creation family name results in all candidate formulas for a specific target food item. Filters may include a score, which relates to how close a candidate formula is to a target food item, and/or a number of ingredients to filter search results by. Filters result in a subset of candidate formulas for the specific target food item that satisfies the filters.

3.4 Recipe Generator

Figure 4A:
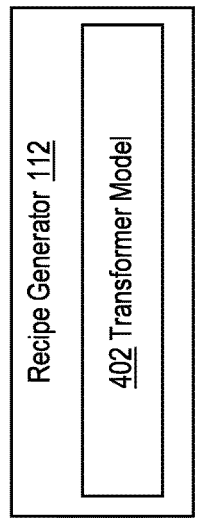
FIG. 4A illustrates an example recipe generator in accordance with some embodiments.

FIG. 4A illustrates an example recipe generator in accordance with some embodiments. In the example of FIG. 4A, the recipe generator 112 comprises a transformer model 402.

The transformer model 402 may be programmed to learn relationships between ingredients, cooking steps, and cooking utensils. The transformer model 402 may use an autoregressive language model architecture on a new set of knowledge, such as recipes. The autoregressive language model architecture may be pre-trained on a corpus of internet data. An example autoregressive language model architecture is a GPT-series model, such as a GPT-2 model. The transformer model 402 may be trained on existing recipes to learn the relationships between ingredients, cooking steps, and cooking utensils. In an embodiment, the recipe generator 112 is trained using a recipe training set that includes recipes from the known recipes database 126. Each recipe in the known recipes database 126 includes ingredients, corresponding quantities, and a cooking process.

During inference, the transformer model 402 may begin generating a cooking process based on a formula, such as a candidate formula previously generated by the formula generator 108, that is provided as input to the transformer model 402. To start the generation, ingredients and respective quantities of the formula are provided, and a first action describing a cooking step, one or more cooking utensils, and/or one or more ingredients is thereafter generated. The generated action may be user-modified prior to generating the next action. To generate the next action, the previous action is added to a list of actions previously generated. The new list of actions may be used as inputs to the transformer model 402. The generation of the new recipe may finish when all ingredients are used and cooking steps have completed. In an embodiment, at the end, a full sequence of the cooking process for a formula to mimic a target food item is generated.

A cooking process generated by the recipe generator 112, for a formula, is stored in the candidate recipes database 124 with a corresponding recipe name or identifier and may be associated with a creation.

3.5 Feedback Collector

Figure 5A:
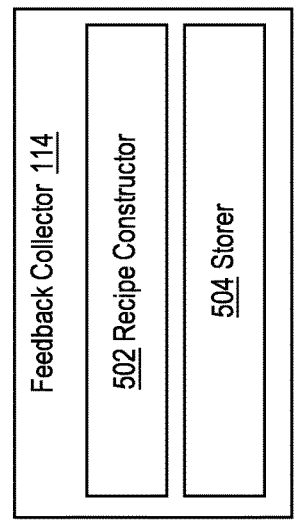
FIG. 5 illustrates an example feedback collector in accordance with some embodiments.
FIGS. 5B, 5C illustrate example graphical user interface displays of a feedback collector in accordance with some embodiments.

FIG. 5A illustrates an example feedback collector in accordance with some embodiments. In the example of FIG. 5A, the feedback collector 114 comprises a recipe constructor 502 and a storer 504.

The recipe constructor 502 may be programmed to associate user-provided feedback with a recipe for which a food item has been cooked according to the recipe. The feedback describes properties of the cooked food item. The properties may include a user-provided flavor profile, other sensorial descriptors (e.g., color, smell, texture, aftertaste, etc.), photos, observations and comments of the cooked food item produced. The user-provided feedback may be provided by a chef.

In an embodiment, the user-provided flavor profile may be validated by the recipe constructor 502 to ensure that user-provided flavor profile includes values that are within specified ranges (e.g., integers between 1 and 5, inclusive). If the values are not within specified ranges, then an error message may be generated to alert the user to reenter values.

The storer 504 may be programmed to store recipes with corresponding feedback in the chef's recipes database 128 of FIG. 1. The evolving dataset of recipes from the chef's recipes database 128 is used to further train the formula generator 108 and/or other machine learning models described herein.

4.0 Example Event Flow

Figure 6:
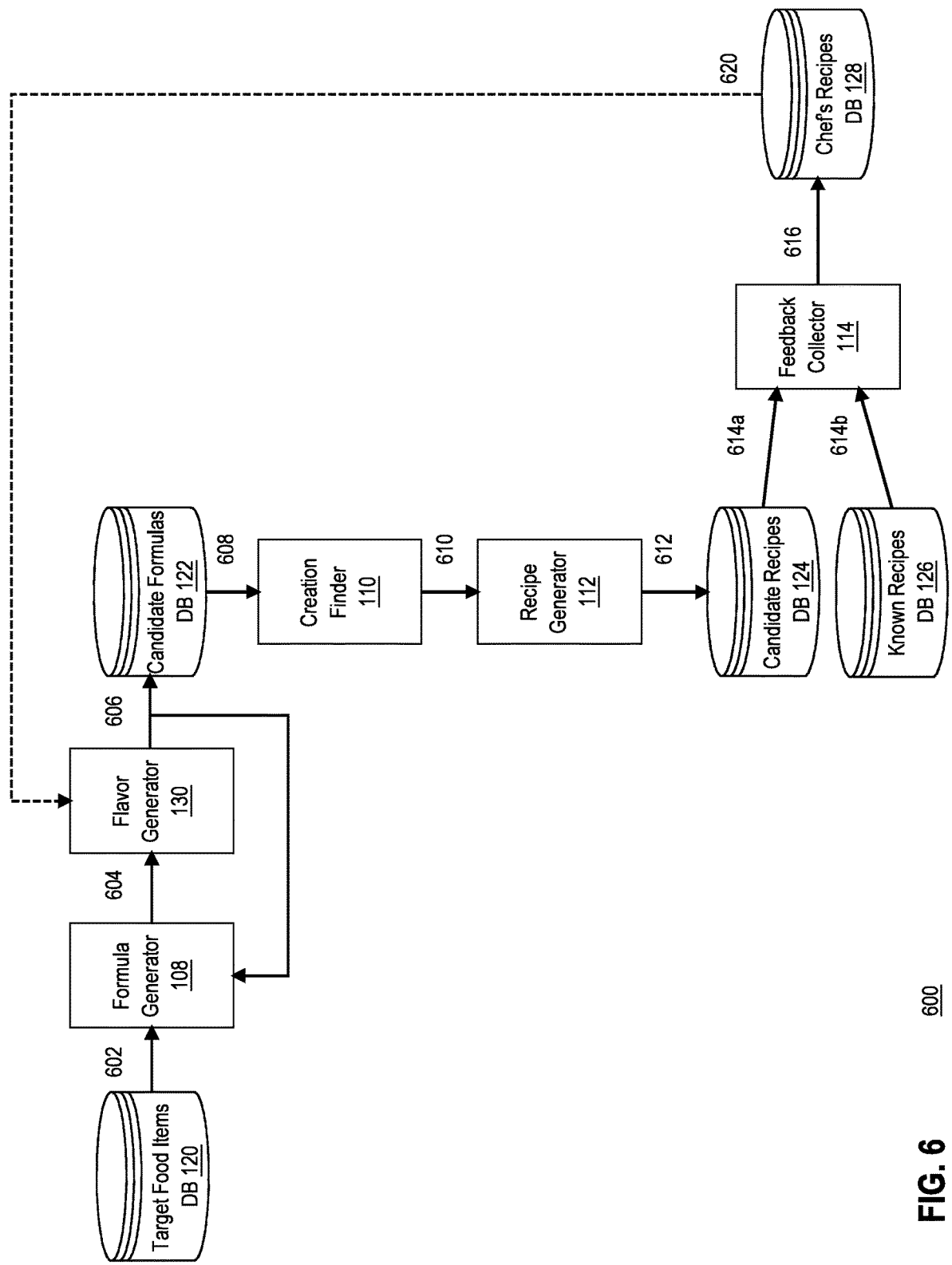
FIG. 6 illustrates an example event flow that may represent an algorithm to form the basis of programming a computer to implement formula and recipe generation using feedback data in accordance with some embodiments.

FIG. 6 illustrates an example event flow that may represent an algorithm to form the basis of programming a computer to implement formula and recipe generation using feedback data, according to an embodiment. For example, the formula generator 108, the flavor generator 130, the creation finder 110, the recipe generator 112, the feedback collector 114, receiving instructions, and displaying instructions may be programmed according to FIG. 6, although one or more of these instructions may not be shown in FIG. 6 for clarity. FIG. 6 represents an algorithm or program that may be used or executed using the computer system of FIG. 1 to implement the functions that are described herein. FIG. 6 is illustrated and described at the same level of detail as used by persons of skill in the technical fields to which this disclosure relates for communicating among themselves about how to structure and execute computer programs to implement embodiments.

FIG. 6 includes a combined diagram 600 of an inference/use flow depicted in a solid line flow line and a training flow depicted in a dashed line flow line.

Referring to the left of the diagram 600, the inference/use flow may start at step 602. Using displaying instructions (not shown in FIG. 6), target food items from the target food items database 120 are displayed on a client computer 104 of FIG. 1. Using receiving instructions (not shown in FIG. 6), a target food item selected from the target food items database 120 is received from the client computer 104 at step 602. Using receiving instructions, one or more controls may also be received from the client computer 104 to control formula generation. The controls may relate to ingredient restrictions, flavor profile, and nutritional features with regard to formula generation. The target food item and the one or more input controls, if any, are input to the formula generator 108.

At step 604, the formula generator 108 generates a candidate formula that mimic the target food item with regards to nutritional features. The candidate formula is generated based on the target food item and the one or more input controls, if any. The candidate formula is input to the flavor generator 130.

At step 606, the flavor generator 130 generates a predicted flavor profile for the candidate formula. Using displaying instructions, the candidate formula and the predicted flavor profile may be displayed on the client computer 104. The candidate formula and the predicted flavor profile are associated with a creation family name and a candidate identifier and are stored in the candidate formulas database 122. The predicted flavor profile may be used to guide the formula generator 108 in generating a subsequent candidate formula such that the subsequent candidate formula better mimics the target food item with regards to nutritional features and flavor features.

Using displaying instructions, creations are displayed by creation names on the client computer 104. Using receiving instructions, a creation selected from the candidate formulas database 122 is received from the client computer at step 608. The creation is associated with a family of one or more candidate formulas that each mimics a corresponding target food item.

Using displaying instructions, information relating to each of the one or more candidate formulas is displayed on client computer 104. Using receiving instructions, a selected candidate formula for the creation is received from the client computer 104 at step 610.

A formula, such as the selected candidate formula, is input to recipe generator 112 to start recipe generation. Using displaying instructions, each action may be sequentially displayed on the client computer 104. Each action describes a cooking step, one or more cooking utensils, and one or more ingredients involved in that step. Using receiving instructions, modification data may be received to change an action before the next action is generated. At step 612, the recipe generator 112 generates a complete candidate recipe. The candidate recipe for the selected candidate formula is stored in the candidate recipes database 124.

A chef may cook different recipes for one target food item or can cook one recipe in different ways. The chef may cook a recipe as is, or can vary quantities or ingredients. A recipe may be from the candidate recipes database 124 or may be from the known recipes database 126. Feedback on the cooked food item may be provided by the chef. Using receiving instructions, a recipe, such as a known recipe or a candidate recipe, and corresponding feedback data for a food item cooked according to the recipe may be received from client device 104 at step 614*a* or 614*b*. The recipe and the feedback data are input to the feedback collector 114.

At step 616, the feedback collector 114 associates the recipe and the feedback data. The recipe and the feedback data are stored in the chef's recipes database 128. The recipes from the chef's recipes database 128 are used to train the flavor generator 130 and/or other machine learning models described herein.

The training flow includes a formula generator training flow for training the flavor generator 130. The formula generator training flow includes step 620. At step 620, the flavor generator 130 receives and trains on recipes from the chef's recipes database 128. The flavor generator 130 may include a plurality of classifiers, each trained on a specific flavor descriptor (e.g., salty, sweet, bitter, sour, and umami). The classifiers are trained to provide a respective output corresponding to a level of that particular flavor. The flavor levels can correspond to a range, e.g. from 1 to 5, but any suitable ranges and/or levels can be used. As an example, the possible flavor levels can be very low (1), low (2), medium (3), high (4), and very high (5). In an embodiment, a single model can be trained to determine flavor descriptors and corresponding flavor levels.

The inference/use flow and the training flow form a formula and recipe generation with a feedback loop. The training set used to train the flavor generator 130 is not only relevant and reliable (as they are internally provided by company employees, chefs) but is also getting larger each time a new recipe with feedback is added to the chef's recipe database 128. As the training set for the flavor generator 130 becomes larger, the accuracy of the flavor generator 130 increases and, consequently, each of the formula generator 108 and the flavor generator 130 increases as well. Using the output of the flavor generator 130 as guidance, the formula generator 108 is able to generate better formulas that mimic target food items, which in turn leads to better recipes generated by the recipe generator 112.

Artificial intelligence models described herein can be run or updated: once; at a predetermined frequency; every time a certain process is performed; every time a trigger condition is satisfied and/or at any other suitable time and frequency. The artificial intelligence models can be run or updated concurrently with one or more other models, serially, at varying frequencies, and/or at any other suitable time. Each artificial intelligence model can be validated, verified, reinforced, calibrated, or otherwise updated based on newly received, up-to-date data, historical data or be updated based on any other suitable data.

As an illustration, assume a chef selects "pork, cured, ham" as a target food item from the target food items database to mimic. Using the formula generator, a candidate formula (ingredients and corresponding quantities) is generated. The ingredients in the candidate formula may be plant-based and selected from the source ingredients database. A flavor profile for the candidate formula may be automatically generated by the flavor generator. The flavor profile of the candidate formula may be used in directing the formula generator in predicting a subsequent candidate formula for the target food item. The formula generator may predict as many candidate formulas as desired by the chef for the target food item, where each subsequent candidate formula may be based on how close the previous prediction was to the target food item in terms of flavor (e.g., based on the flavor profile of the previous predicted formula). Each combination of a candidate formula and corresponding predicted flavor may be stored in the candidate formulas database.

The chef selects, for example, one of the candidate formulas generated by the formula generator that mimics "pork, cured, ham." The chef may find this formula from the candidate formulas database using the creation finder. The recipe generator predicts a candidate recipe for the selected candidate formula. The candidate recipe includes a cooking process for the formula. The cooking process may include a set of actions, cooking utensils, or steps to cook the set of ingredients of the formula. The candidate recipe may be stored in the candidate recipes database.

The chef cooks a food item according to the candidate recipe. The cooked food item is tasted by the chef. The chef provides feedback regarding, among other things, a flavor profile (e.g., salty, sweet, bitter, sour, and/or umami, and corresponding flavor intensity levels) of the cooked food item. The feedback collector associates and stores the candidate recipe and feedback in the chef's recipes database.

The chef's feedback and recipe of the cooked food item are used to build up the training set for the flavor generator. As the quality of the training set for the flavor generator improves, the accuracy of the flavor generator increases. The more accurate the flavor generator is, the more accurate predicted flavors are. Since a predicted flavor directs the formula generator in making a subsequent formula prediction, a new predicted formula would be closer to the target food item in terms of nutrition and flavor. Better predicted formulas lead to better predicted recipes.

5.0 Graphical User Interface Implementations

FIGS. 2B-2E illustrate example graphical user interface (GUI) displays of a formula generator in accordance with some embodiments. FIG. 2B illustrates an example GUI 250 that is configured to allow a user to search for a target food item from the target food items database 120 of FIG. 1. In an embodiment, the target food items in the target food items database 120 may be searched based on a name, an ingredient, and/or description. In FIG. 2B, "fish" is input in a search field and a listing of target food items matching the search criteria is shown. In FIGS. 2B-2E, assume the user has selected "Fish, anchovy, european, raw" as a target food item to mimic.

FIGS. 2C-2E each illustrates an example GUI that is configured to allow the user to provide constraints to control formula generation. In example GUI 252 of FIG. 2C, the user is able to specify ingredients to be avoided in, to be excluded from, and/or included in candidate formulas. For example, the user has specified to avoid soy and to exclude "nuts, cashew butter, plain, without salt added" in candidate formulas. Gluten, nuts, and honey can also be selected as groups to avoid.

In example GUI 254 of FIG. 2D, the user is able to specify that candidate formulas should have a certain flavor profile. For example, the user has selected saltiness and umaminess and provided intensity levels or values of 4 and 2, respectively, for the selected flavor descriptors. In an embodiment, the range of intensity values for a flavor descriptor is from one (1) to five (5). The possible intensity values one (1) to five (5) may imply very low, low, medium, high, and very high, respectively. To provide context, water has an intensity value of one (1) for saltiness; a dessert would have a high level of sweetness; soy sauce would have a high level of saltiness.

In example GUI 256 of FIG. 2E, the user is able to change a default amount for one or more nutritional features of the target food item. For example, the user has indicated 30 g of protein and 2 grams of fat but did not change the default amounts for fiber carbs and sugar carbs.

Based on the various constraint inputs, the formula generator 108 of FIG. 1 will generate one or more candidate formulas that mimic the target food item and that satisfy the constraints.

FIGS. 3B-3E illustrate example graphical user interface displays of a creation finder in accordance with some embodiments. FIG. 3B illustrates an example GUI 350 that is configured to allow a user to search for a creation (e.g., a family of one or more candidate formulas that mimic a target food item). In an embodiment, the creations may be searched by name and/or description.

Figure 3C:
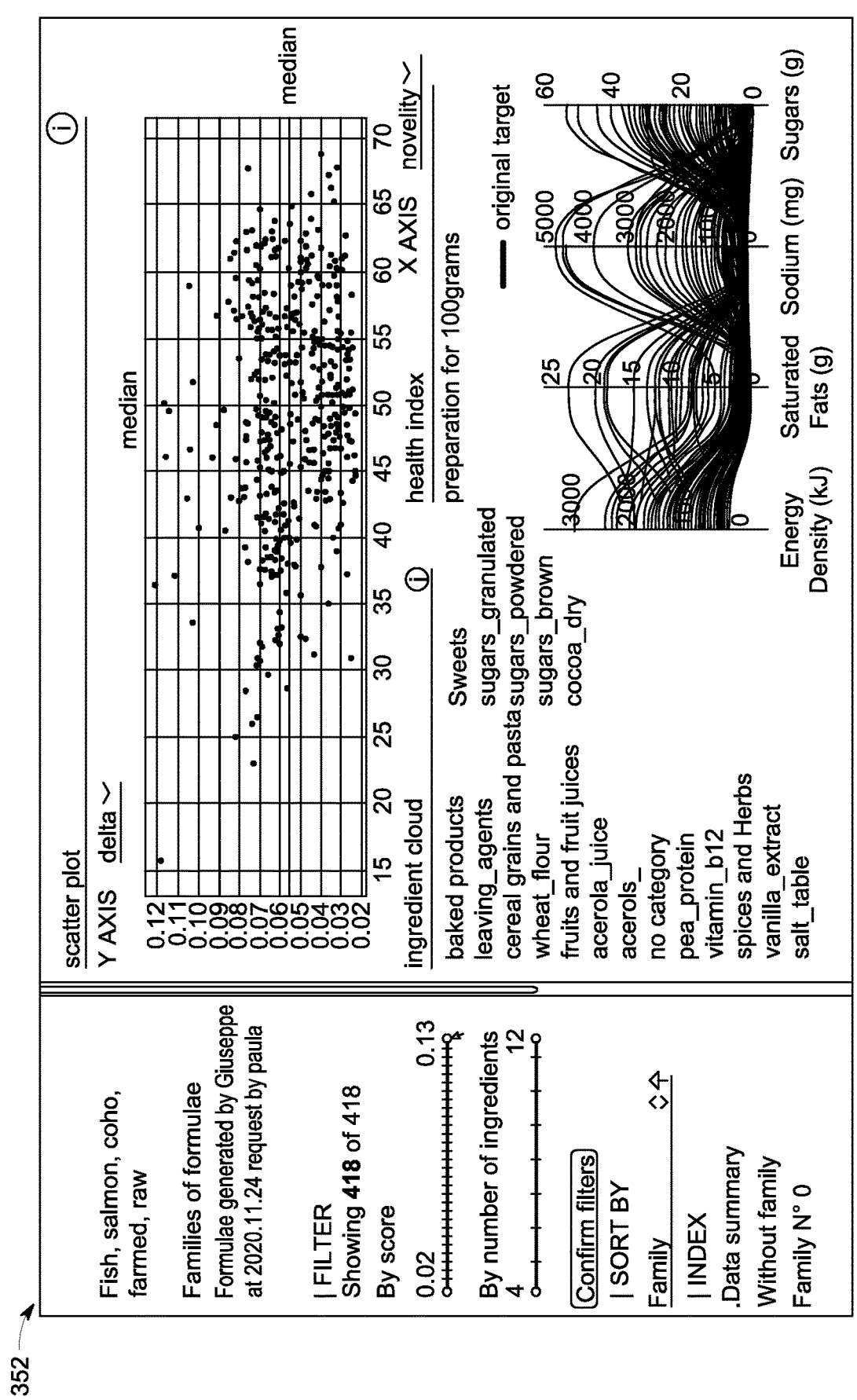
Figure 3D:
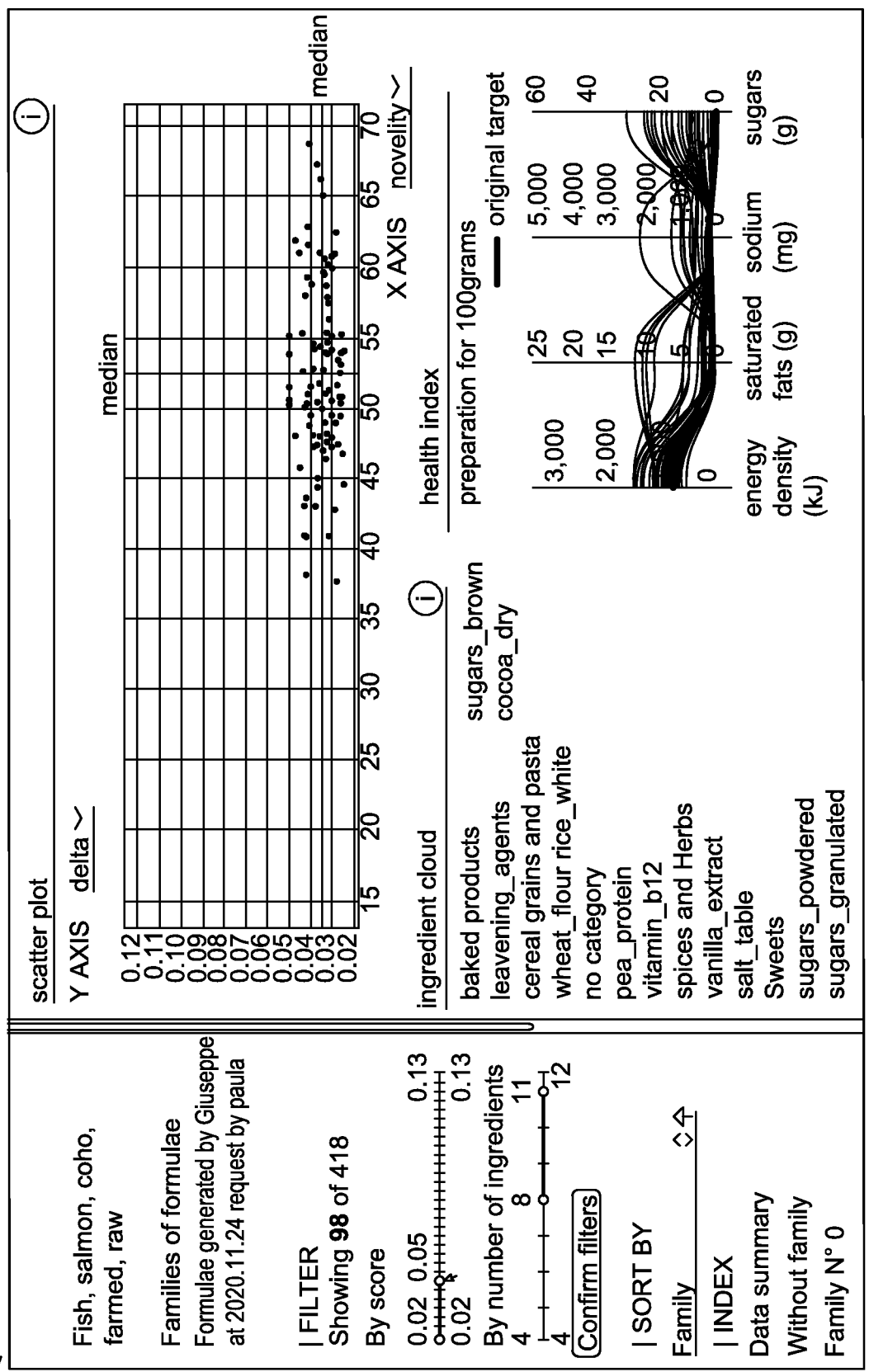

In FIGS. 3C-3D, assume the user has selected "fish, salmon, coho, farmed raw" as the creation. FIG. 3C illustrates an example GUI 352 that is configured to allow the user to further search for a particular candidate formula for the "fish, salmon, coho, farmed raw" creation. As illustrated, there are 418 candidate formulas, in which different representations are shown. For example, the candidate formulas are represented in a scatter plot and in a health index graph. The user is able to narrow the search by score and/or number of ingredients. By narrowing the score to between 0.02 and 0.05 and the number of ingredients between 8-11, there are 98 candidate formulas out of 418 candidate formulas that satisfy the additional search criteria, as shown in example GUI 354 of FIG. 3D. A candidate formula can be selected from one of the dots in the scatter plot or one of the curves in the health index graph to access information about that candidate formula.

Figure 3E:
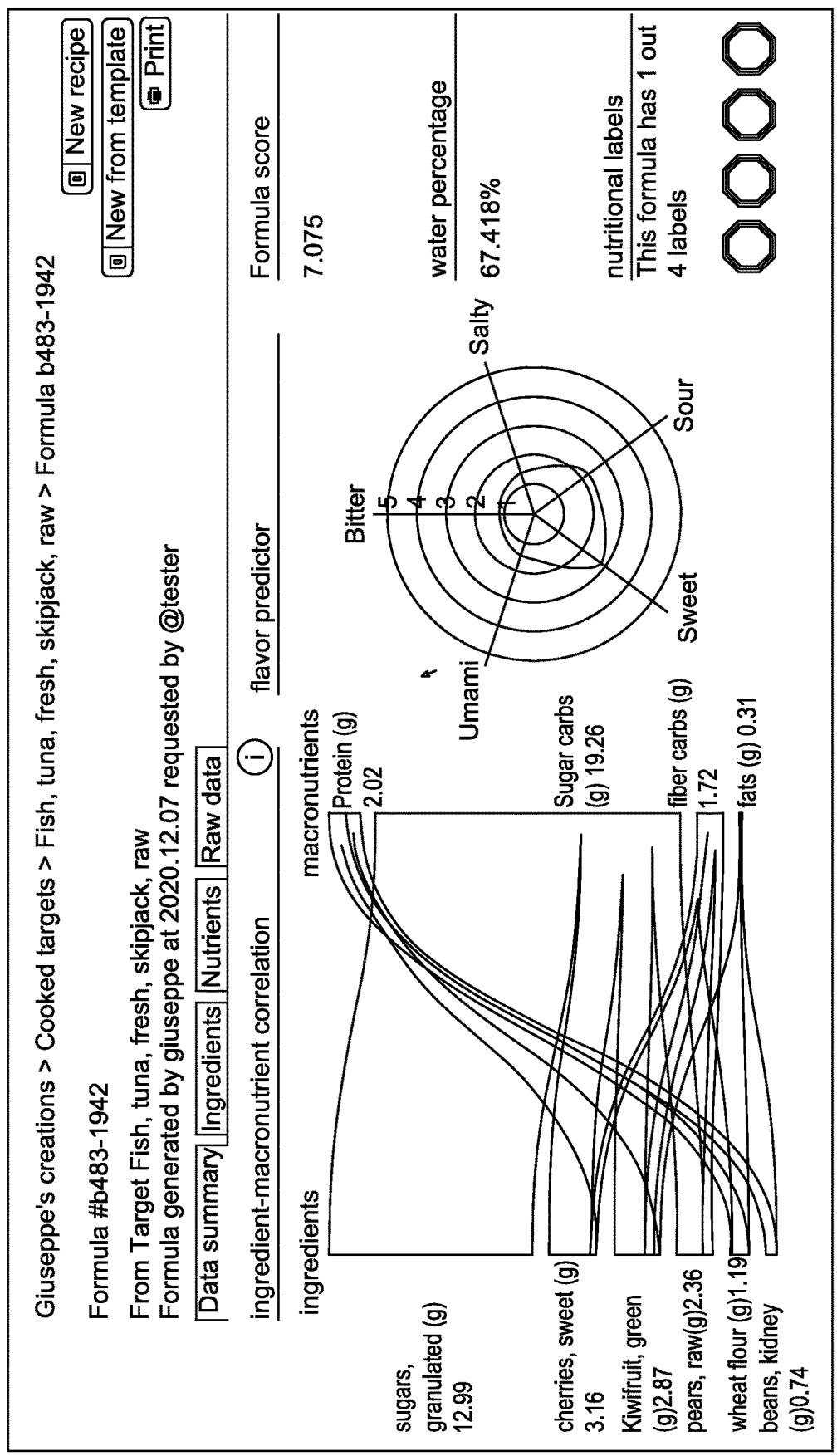

Example GUI 356 of FIG. 3E shows information about a particular candidate formula of the "fish, tuna, fresh, skipjack, raw" creation. The information includes an ingredient-macronutrient correlation, a flavor prediction (salty, sweet, bitter, sour, and umami, and corresponding flavor intensity scores) in a radar-type graph, a formula score (e.g., how close the candidate formula is to the target food item in terms of features), and water percentage. From the GUI 356, the candidate formula may be provided as input to the recipe generator 112 of FIG. 1.

FIGS. 4B, 4C illustrate example graphical user interface displays of a recipe generator in accordance with some embodiments. FIG. 4B illustrates an example GUI 450 that is configured to allow a user to input ingredients and corresponding quantities or amounts to generate a cooking process. However, the data may be automatically populated from the GUI 356 of FIG. 3E. FIG. 4C illustrates an example GUI 452 that is configured to allow the user to generate a cooking process using the recipe generator 112. Each step of the cooking process may be modified by the user prior to generating the next step via a "Generate step" graphical user interface button or the like. From the GUI 452, the recipe (ingredients, quantities, cooking process) may be provided as input to the feedback collector 114 of FIG. 1.

Figure 5C:

FIGS. 5B, 5C illustrate example graphical user interface displays of a feedback collector in accordance with some embodiments. FIG. 5B illustrates an example GUI 552 that is configured to allow a user to input ingredients, corresponding quantities/amounts, and cooking steps. Shorthand notations (e.g., $1, $2, $3, $4, $5, =1, =2, =3, =4) may be used to simply input. For example, the notation "$1" may represent "nori seaweed" and during input of the steps, the notation may be used as a shortcut to indicate "nori seaweed." However, the data may be automatically populated from the GUI 452 of FIG. 4C. FIG. 5C illustrates an example GUI 554 that is configured to allow the user to input feedback including color, smell, flavor, texture, aftertaste, flavor descriptors (e.g., bitterness, saltiness, sourness, sweetness, and/or umaminess) and values, photos, observations and comments. From the GUI 552, the recipe and the feedback are stored in the chef's recipe database 128 and can used in future training of the flavor generator 130.

6.0 Procedural Overview

Figure 7:
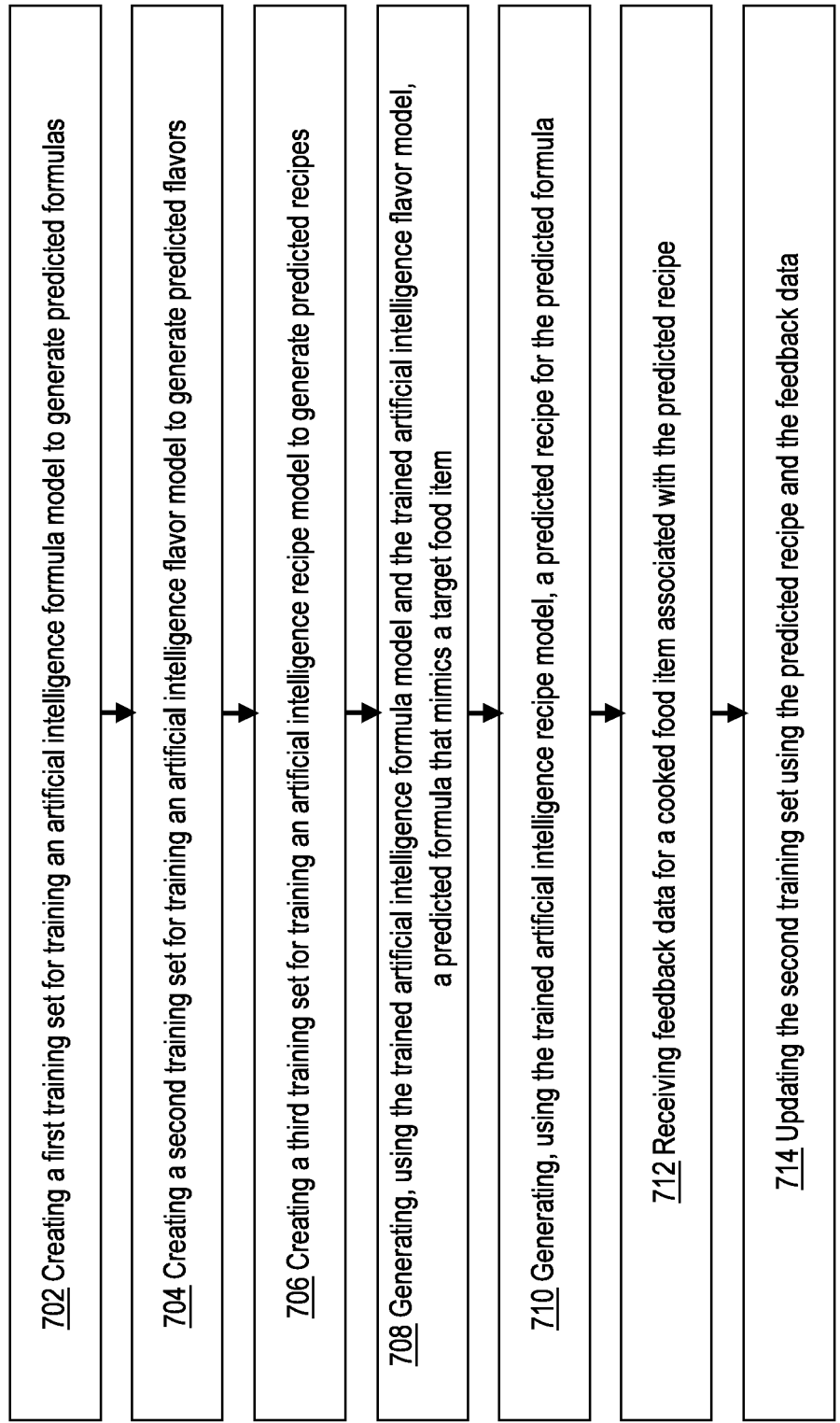
FIG. 7 illustrates an example method to generate a candidate formula in accordance with some embodiments.

FIG. 7 illustrates an example method 700 to generate a candidate formula to mimic a target food item, in accordance with some embodiments. For example, the candidate formula is of a plant-based food item, and the target food item is not plant-based. FIG. 7 may be used as a basis to code the method 700 as one or more computer programs or other software elements that a server computer can execute or host.

At step 702, a first training set is created for training an artificial intelligence formula model to generate predicted formulas. The first training set includes first sets of ingredients of a plurality of first recipes. Each set of the first sets of ingredients is associated with a recipe from the plurality of first recipes.

For example, the artificial intelligence formula model is the formula generator 108 of FIG. 1, and the first training set includes sets of ingredients of recipes from the known recipes database 126 of FIG. 1. Each ingredient may be represented as an ingredient vector including a component corresponding to physiochemical, nutritional, and/or molecular descriptors or features (referred to herein as nutritional features).

At step 704, a second training set is created for training an artificial intelligence flavor model to generate predicted flavors. The second training set includes second sets of ingredients of a plurality of second recipes and flavor profiles. Each set of the second sets of ingredients and a respective flavor profile are associated with a recipe from the plurality of second recipes.

For example, the artificial intelligence flavor model is the flavor generator 130 of FIG. 1, and the second training set includes recipes from the chef's recipes database 128. Each recipe has been cooked by a chef and feedback on the cooked food item has been provided. The feedback describes properties of the cooked food item. The properties may include a flavor profile (e.g., salty, sweet, bitter, sour, and/or umami, and corresponding flavor intensity levels). The feedback may also include other sensorial descriptors (e.g., color, smell, texture, aftertaste, etc.), photos, observations and comments of the cooked food item produced. A recipe may be represented as a recipe vector including at least a first component corresponding to physiochemical, nutritional, and/or molecular descriptors or features (referred to herein as nutritional features), and a second component corresponding to the ingredients present in the recipe. A flavor profile may be represented as a flavor vector.

At step 706, a third training set is created for training an artificial intelligence recipe model to generate predicted recipes. The third training set includes the plurality of first recipes.

For example, the artificial intelligence recipe model is the recipe generator 112 of FIG. 1, and the third training set includes recipes from the known recipes database 126.

At step 708, a predicted formula that mimics a target food item is generated using the trained artificial intelligence formula model and the trained artificial intelligence flavor model. The predicted formula mimics the target food item with regards to nutritional features and flavor features.

For example, the formula generator 108 generates a candidate formula based on the nutritional features of the target food item. The flavor generator 130 generates a flavor profile for the candidate formula. The flavor profile includes flavor features (e.g., sweetness, saltiness, sourness, bitterness, and/or umaminess) and corresponding flavor intensity levels. The flavor profile may be used to guide the formula generator 108 in generating a subsequent candidate formula such that the subsequent candidate formula better mimics the target food item with regards to nutritional features and flavor features.

In an embodiment, the formula generator 108 comprises the prediction model 206 of FIG. 2A that is trained to obtain a latent space with a probability distribution of the first training set, wherein ingredients of the predicted formula are generated by decoding a latent code sampled from the latent space. The latent space may be sampled according to user-provided control definitions. The user-provided control definitions include one or more of ingredient restriction definitions, flavor profile definitions, or nutritional feature definitions, as illustrated in FIGS. 2C-2E.

At step 710, a predicted recipe for the predicted formula is generated using the trained artificial intelligence recipe model. In an embodiment, a plurality of actions for the predicted recipe is sequentially generated. A first action of the plurality of actions is based on the predicted formula. After each generated action, the chef may modify the action. Each subsequent action of the plurality of action is based on one or more previous actions.

For example, the recipe generator 112 generates a cooking process. Each step of the cooking process is dependent on a previous step and may be user-modified. To generate the next step, the previous step is added to a list of steps previously generated. The new list of steps may be used as inputs to the recipe generator. An example complete cooking process is illustrated in FIG. 4C.

At step 712, feedback data is received for a cooked item associated with the predicted recipe. The feedback data includes a flavor profile (salty, sweet, bitter, sour, and umami, and corresponding flavor intensity levels) of the cooked food item. The feedback data may also include other sensorial descriptors (e.g., color, smell, texture, aftertaste, etc.), photos, observations and comments of the cooked food item, and the like. An example feedback data is illustrated in FIG. 5B.

At step 714, the second training set is updated using the predicted recipe and the feedback data. In an embodiment, the artificial intelligence flavor model may be subsequently trained using the updated second training set.

Techniques described herein continuously builds up the training set for the flavor generator 130 by using feedback data of recipes. Using a robust training set increases the accuracy of the flavor generator 130. A more accurate flavor generator 130 leads to a more accurate formula generator 108, which in turn results in a more accurate recipe generator 112. As described herein, using outputs of the flavor generator 130 as guidance, the formula generator 108 is able to generate better formulas that mimic target food items, which in turn leads to better recipes generated by the recipe generator 112.

7.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
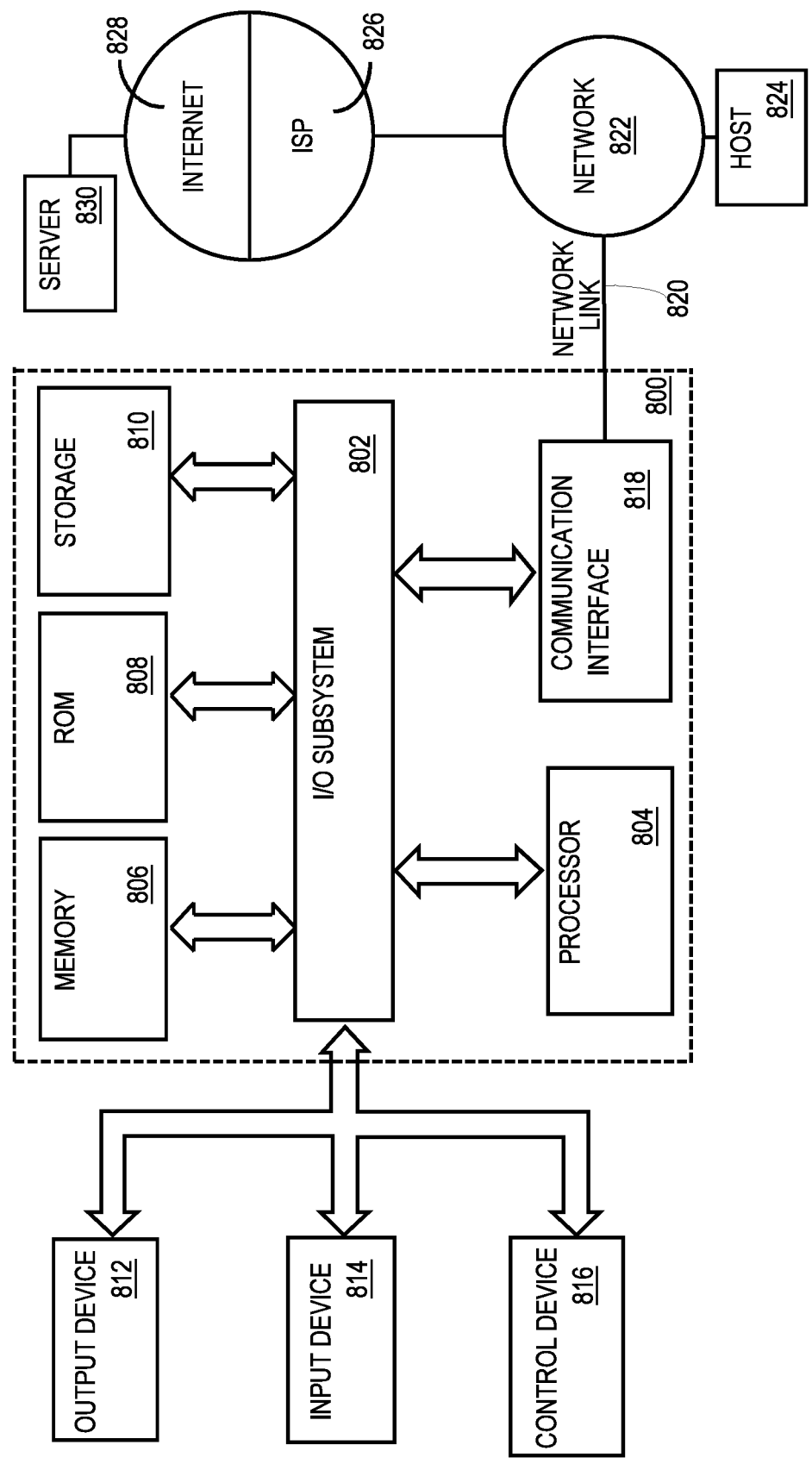
FIG. 8 illustrates a block diagram of a computing device in which the example embodiment(s) of the present invention may be embodiment.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk, or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators, or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, inter-network, or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic, or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine, or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

8.0 Software Overview

Figure 9:
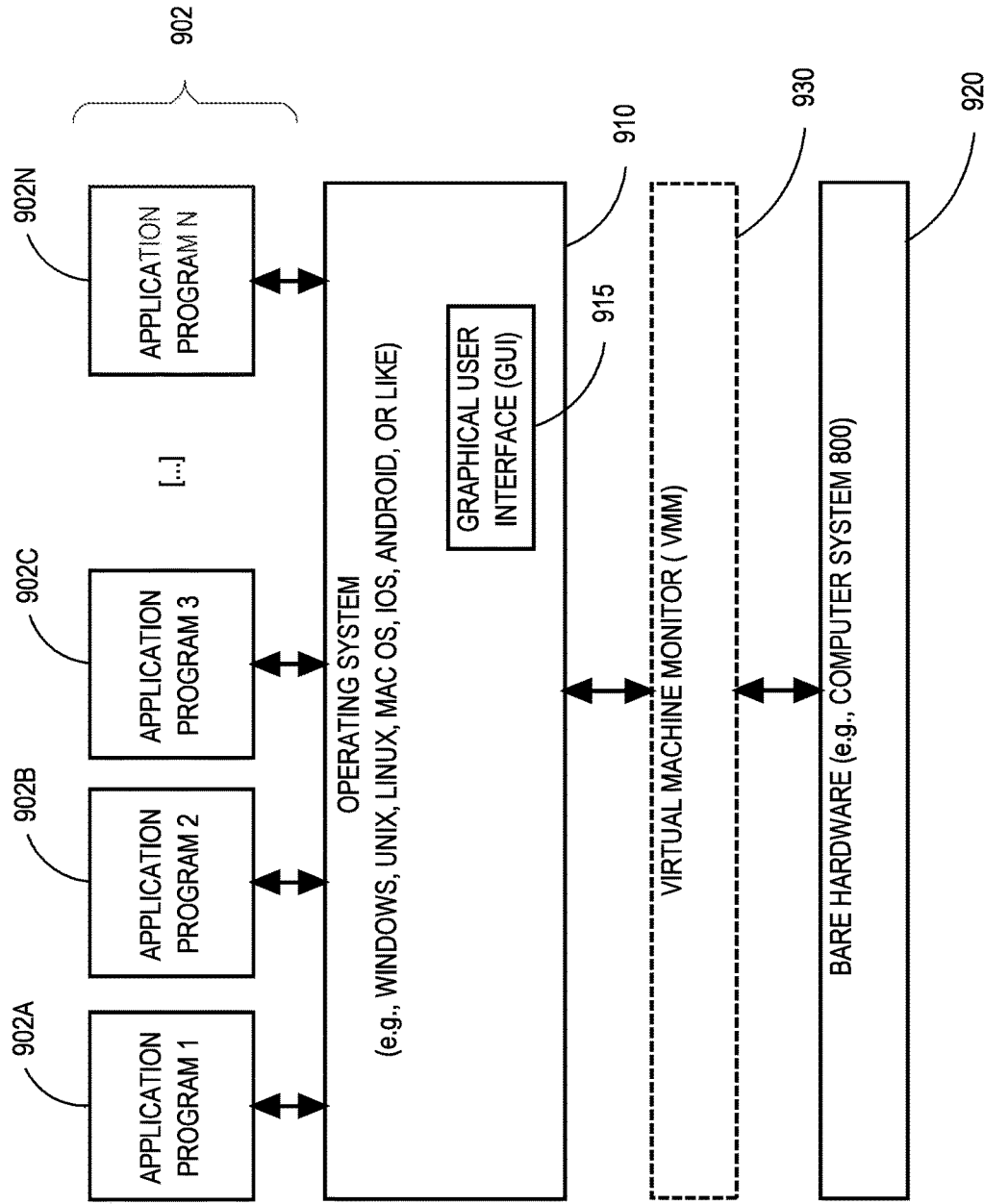
FIG. 9 illustrates a block diagram of a basic software system for controlling the operation of a computing device.

FIG. 9 is a block diagram of a basic software system 900 that may be employed for controlling the operation of computing device 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing device 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on device 900 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of device 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the device 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of device 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

9.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
   training, using a first training set, an artificial intelligence formula model to generate predicted formulas, wherein the first training set includes first sets of ingredients of a plurality of first recipes, wherein each set of the first sets of ingredients is associated with a recipe from the plurality of first recipes, wherein the artificial intelligence formula model is trained to obtain a latent space with a probability distribution of the first training set, wherein ingredients of the predicted formula are generated by decoding a latent code sampled from the latent space;
   training, using a second training set, an artificial intelligence flavor model to generate predicted flavors, wherein the second training set includes second sets of ingredients of a plurality of second recipes and flavor profiles, each set of the second sets of ingredients and a respective flavor profile are associated with a recipe from the plurality of second recipes, wherein the artificial intelligence flavor model is trained to obtain a function mapping the second sets of ingredients to the flavor profiles;

training, using a third training set, an artificial intelligence recipe model to generate predicted recipes, wherein the third training set includes the plurality of first recipes, wherein the artificial intelligence recipe model is trained to learn relationships between at least ingredients and cooking steps of the plurality of first recipes;

generating, using the trained artificial intelligence formula model and the trained artificial intelligence flavor model, a predicted formula that mimics a target food item;

generating, using the trained artificial intelligence recipe model, a predicted recipe for the predicted formula;

receiving feedback data for a cooked food item associated with the predicted recipe, wherein the feedback data includes a flavor profile of the cooked food item;

updating the second training set using the predicted recipe and the feedback data.

2. The method of claim 1, wherein the latent space is sampled according to user-provided control definitions, wherein the user-provided control definitions include one or more of ingredient restriction definitions, flavor profile definitions, or nutritional feature definitions.

3. The method of claim 1, wherein the predicted formula mimics the target food item with regards to nutritional features and flavor features.

4. The method of claim 1, wherein the artificial intelligence flavor model comprises a classifier architecture, and the artificial intelligence recipe model comprises an autoregressive language model architecture.

5. The method of claim 1, wherein generating the predicted recipe comprising sequentially generating a plurality of actions, wherein a first action of the plurality of actions is based on the predicted formula, and each subsequent action of the plurality of actions is based on one or more previous actions.

6. The method of claim 5, wherein at least one the one or more previous actions is user-modified.

7. The method of claim 1, further comprising using the updated second training set to train the artificial intelligence flavor model.

8. One or more non-transitory computer-readable storage media storing one or more instructions programmed for generating a candidate set of ingredients, when executed by one or more computing devices, cause:

training, using a first training set, an artificial intelligence formula model to generate predicted formulas, wherein the first training set includes first sets of ingredients of a plurality of first recipes, wherein each set of the first sets of ingredients is associated with a recipe from the plurality of first recipes, wherein the artificial intelligence formula model is trained to obtain a latent space with a probability distribution of the first training set, wherein ingredients of the predicted formula are generated by decoding a latent code sampled from the latent space;

training, using a second training set, an artificial intelligence flavor model to generate predicted flavors, wherein the second training set includes second sets of ingredients of a plurality of second recipes and flavor profiles, each set of the second sets of ingredients and a respective flavor profile are associated with a recipe from the plurality of second recipes, wherein the artificial intelligence flavor model is trained to obtain a function mapping the second sets of ingredients to the flavor profiles;

training, using a third training set, an artificial intelligence recipe model to generate predicted recipes, wherein the third training set includes the plurality of first recipes, wherein the artificial intelligence recipe model is trained to learn relationships between at least ingredients and cooking steps of the plurality of first recipes;

generating, using the trained artificial intelligence formula model and the trained artificial intelligence flavor model, a predicted formula that mimics a target food item;

generating, using the trained artificial intelligence recipe model, a predicted recipe for the predicted formula;

receiving feedback data for a cooked food item associated with the predicted recipe, wherein the feedback data includes a flavor profile of the cooked food item;

updating the second training set using the predicted recipe and the feedback data.

9. The one or more non-transitory computer-readable storage media of claim 8, wherein the latent space is sampled according to user-provided control definitions, wherein the user-provided control definitions include one or more of ingredient restriction definitions, flavor profile definitions, or nutritional feature definitions.

10. The one or more non-transitory computer-readable storage media of claim 8, wherein the predicted formula mimics the target food item with regards to nutritional features and flavor features.

11. The one or more non-transitory computer-readable storage media of claim 8, wherein generating the predicted recipe comprising sequentially generating a plurality of actions, wherein a first action of the plurality of actions is based on the predicted formula, and each subsequent action of the plurality of actions is based on one or more previous actions.

12. The one or more non-transitory computer-readable storage media of claim 8, wherein the one or more instructions, when executed by the one or more computing devices, further cause using the updated second training set to train the artificial intelligence flavor model.

13. A computing system comprising:
one or more computer systems comprising one or more hardware processors and storage media; and
instructions stored in the storage media and which, when executed by the computing system, cause the computing system to perform:
training, using a first training set, an artificial intelligence formula model to generate predicted formulas, wherein the first training set includes first sets of ingredients of a plurality of first recipes, wherein each set of the first sets of ingredients is associated with a recipe from the plurality of first recipes, wherein the artificial intelligence formula model is trained to obtain a latent space with a probability distribution of the first training set, wherein ingredients of the predicted formula are generated by decoding a latent code sampled from the latent space;
training, using a second training set, an artificial intelligence flavor model to generate predicted flavors, wherein the second training set includes second sets of ingredients of a plurality of second recipes and flavor profiles, each set of the second sets of ingredients and a respective flavor profile are associated with a recipe from the plurality of second recipes, wherein the artificial intelligence flavor model is trained to obtain at least one function mapping the second sets of ingredients to the flavor profiles;

training, using a third training set, an artificial intelligence recipe model to generate predicted recipes, wherein the third training set includes the plurality of first recipes, wherein the artificial intelligence recipe model is trained to learn relationships between at least ingredients and cooking steps of the plurality of first recipes;

generating, using the trained artificial intelligence formula model and the trained artificial intelligence flavor model, a predicted formula that mimics a target food item;

generating, using the trained artificial intelligence recipe model, a predicted recipe for the predicted formula;

receiving feedback data for a cooked food item associated with the predicted recipe, wherein the feedback data includes a flavor profile of the cooked food item;

updating the second training set using the predicted recipe and the feedback data.

14. The computing system of claim 13, wherein the latent space is sampled according to user-provided control definitions, wherein the user-provided control definitions include one or more of ingredient restriction definitions, flavor profile definitions, or nutritional feature definitions.

15. The computing system of claim 13, wherein the predicted formula mimics the target food item with regards to nutritional features and flavor features.

16. The computing system of claim 13, wherein generating the predicted recipe comprising sequentially generating a plurality of actions, wherein a first action of the plurality of actions is based on the predicted formula, and each subsequent action of the plurality of actions is based on one or more previous actions.

17. The computing system of claim 13, wherein the instructions stored in the storage media and which, when executed by the computing system, cause the computing system to further perform using the updated second training set to train the artificial intelligence flavor model.

18. The method of claim 1, wherein the artificial intelligence formula model comprises a first autoencoder and a second autoencoder, wherein the latent space is obtained by the second autoencoder, wherein the latent code is decoded based on a particular encoded representation, of the first sets of ingredients, generated by the first autoencoder model.

19. The method of claim 1, wherein artificial intelligence flavor model comprises:

a certainty level classifier that generates, for each flavor category of a plurality of flavor categories, a certainty level to indicate a level of certainty that a flavor associated with that flavor category is present in a particular set of ingredients;

a plurality of flavor predictors associated with the plurality of flavor categories, wherein each flavor predictor generates a deeper level of flavor granularity corresponding to an associated flavor category.

20. The method of claim 1, wherein the predicted formula comprises at least a set of one or more ingredients that mimics the target food item with regards to nutritional features.

* * * * *